(12) United States Patent
Taillefer et al.

(10) Patent No.: US 9,092,253 B2
(45) Date of Patent: *Jul. 28, 2015

(54) INSTRUMENTATION OF HARDWARE ASSISTED TRANSACTIONAL MEMORY SYSTEM

(75) Inventors: Martin Taillefer, Redmond, WA (US); Jan Gray, Bellevue, WA (US); Richard Wurdack, Seattle, WA (US); Gad Sheaffer, Haifa (IL); Ali-Reza Adl Tabatabai, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1055 days.

This patent is subject to a terminal disclaimer.

(21) Appl. No.: 12/638,345

(22) Filed: Dec. 15, 2009

(65) Prior Publication Data

US 2011/0145498 A1 Jun. 16, 2011

(51) Int. Cl.
*G06F 9/44* (2006.01)
*G06F 9/46* (2006.01)
*G06F 11/36* (2006.01)
*G06F 11/34* (2006.01)

(52) U.S. Cl.
CPC ............ *G06F 9/467* (2013.01); *G06F 11/3466* (2013.01); *G06F 11/3612* (2013.01); *G06F 11/3636* (2013.01); *G06F 11/3648* (2013.01); *G06F 11/3409* (2013.01); *G06F 2201/86* (2013.01); *G06F 2201/87* (2013.01); *G06F 2201/88* (2013.01); *G06F 2201/885* (2013.01)

(58) Field of Classification Search
None
See application file for complete search history.

(56) References Cited

U.S. PATENT DOCUMENTS

| | | | |
|---|---|---|---|
| 4,442,487 A | 4/1984 | Fletcher | |
| 5,394,555 A | 2/1995 | Hunter | |
| 5,404,555 A | 4/1995 | Liu | |
| 5,428,761 A | 6/1995 | Herlihy et al. | |
| 5,768,500 A | 6/1998 | Agrawal | |
| 5,835,764 A | 11/1998 | Platt | |
| 5,933,632 A * | 8/1999 | Cahill, III | 719/331 |
| 6,272,607 B1 * | 8/2001 | Baentsch et al. | 711/162 |
| 6,314,563 B1 | 11/2001 | Agensen | |
| 6,665,704 B1 | 12/2003 | Singh | |
| 6,751,617 B1 | 6/2004 | Anfindsen | |
| 6,842,830 B2 | 1/2005 | Khare | |

(Continued)

OTHER PUBLICATIONS

Office Action dated Oct. 5, 2012 cited in U.S. Appl. No. 12/493,167.

(Continued)

*Primary Examiner* — Jason Mitchell
(74) *Attorney, Agent, or Firm* — Kevin Sullivan; Raghu Chinagudabha; Micky Minhas

(57) ABSTRACT

Monitoring performance of one or more architecturally significant processor caches coupled to a processor. The methods include executing an application on one or more processors coupled to one or more architecturally significant processor caches, where the application utilizes the architecturally significant portions of the architecturally significant processor caches. The methods further include at least one of generating metrics related to performance of the architecturally significant processor caches; implementing one or more debug exceptions related to performance of the architecturally significant processor caches; or implementing one or more transactional breakpoints related to performance of the architecturally significant processor caches as a result of utilizing the architecturally significant portions of the architecturally significant processor caches.

20 Claims, 5 Drawing Sheets

(56) References Cited

U.S. PATENT DOCUMENTS

| | | | |
|---|---|---|---|
| 6,845,430 | B2 | 1/2005 | Hopeman |
| 6,862,635 | B1 | 3/2005 | Alverson |
| 6,871,264 | B2 | 3/2005 | Soltis |
| 6,898,609 | B2 | 5/2005 | Kerwin |
| 6,938,128 | B1 | 8/2005 | Kuskin et al. |
| 6,976,155 | B2 | 12/2005 | Drysdale |
| 7,111,294 | B2 | 9/2006 | Steensgaard |
| 7,127,561 | B2 | 10/2006 | Hill |
| 7,162,512 | B1 | 1/2007 | Amit |
| 7,181,578 | B1 | 2/2007 | Guha |
| 7,210,145 | B2 | 4/2007 | Srinivasan |
| 7,213,106 | B1 | 5/2007 | Koster |
| 7,246,123 | B2 | 7/2007 | Carr |
| 7,284,091 | B2 * | 10/2007 | Chow et al. ............ 711/118 |
| 7,320,065 | B2 | 1/2008 | Gosior |
| 7,343,476 | B2 | 3/2008 | Floyd et al. |
| 7,376,800 | B1 | 5/2008 | Choquette |
| 7,395,382 | B1 | 7/2008 | Moir |
| 7,406,698 | B2 | 7/2008 | Richardson |
| 7,421,544 | B1 * | 9/2008 | Wright et al. ............ 711/150 |
| 7,467,323 | B2 | 12/2008 | Fields |
| 7,478,210 | B2 | 1/2009 | Saha |
| 7,502,897 | B2 | 3/2009 | Hertzberg |
| 7,512,636 | B2 | 3/2009 | Verma |
| 7,516,366 | B2 | 4/2009 | Lev |
| 7,548,919 | B2 * | 6/2009 | Gupta et al. ............ 1/1 |
| 7,584,232 | B2 | 9/2009 | Guo |
| 7,711,909 | B1 | 5/2010 | Lev et al. |
| 7,856,537 | B2 | 12/2010 | Kumar |
| 7,860,847 | B2 | 12/2010 | Detlefs et al. |
| 8,095,824 | B2 | 1/2012 | Gray |
| 8,229,907 | B2 | 7/2012 | Gray |
| 8,533,383 | B2 | 9/2013 | Ohrmstrom et al. |
| 8,799,582 | B2 * | 8/2014 | Sheaffer et al. ............ 711/141 |
| 2003/0055807 | A1 * | 3/2003 | Lomet ............ 707/1 |
| 2003/0145136 | A1 * | 7/2003 | Tierney et al. ............ 710/3 |
| 2003/0188300 | A1 | 10/2003 | Patrudu |
| 2004/0162951 | A1 * | 8/2004 | Jacobson et al. ............ 711/143 |
| 2004/0243868 | A1 | 12/2004 | Toll et al. |
| 2005/0060495 | A1 | 3/2005 | Pistoulet |
| 2005/0246487 | A1 | 11/2005 | Ergan |
| 2006/0085591 | A1 | 4/2006 | Kumar |
| 2007/0143287 | A1 | 6/2007 | Adl-Tabatabai |
| 2007/0143741 | A1 | 6/2007 | Harris |
| 2007/0156780 | A1 | 7/2007 | Saha |
| 2007/0156971 | A1 * | 7/2007 | Sistla et al. ............ 711/141 |
| 2007/0156994 | A1 | 7/2007 | Akkary |
| 2007/0186056 | A1 | 8/2007 | Saha et al. |
| 2007/0198792 | A1 | 8/2007 | Dice |
| 2007/0198979 | A1 | 8/2007 | Dice |
| 2007/0239943 | A1 | 10/2007 | Dice |
| 2007/0245099 | A1 | 10/2007 | Gray |
| 2007/0245128 | A1 | 10/2007 | Gray |
| 2007/0260608 | A1 | 11/2007 | Hertzberg |
| 2007/0260942 | A1 | 11/2007 | Rajwar |
| 2008/0021934 | A1 | 1/2008 | Hudson |
| 2008/0040551 | A1 | 2/2008 | Gray |
| 2008/0098374 | A1 * | 4/2008 | Adl-tabatabai et al. ....... 717/145 |
| 2008/0126764 | A1 * | 5/2008 | Wu et al. ............ 712/226 |
| 2008/0127035 | A1 | 5/2008 | Lev |
| 2008/0162886 | A1 | 7/2008 | Saha |
| 2008/0163220 | A1 | 7/2008 | Wang |
| 2008/0256074 | A1 * | 10/2008 | Lev et al. ............ 707/8 |
| 2008/0270745 | A1 | 10/2008 | Saha |
| 2009/0006407 | A1 | 1/2009 | Magruder |
| 2009/0006467 | A1 | 1/2009 | Visscher |
| 2009/0006751 | A1 | 1/2009 | Taillefer |
| 2009/0006767 | A1 | 1/2009 | Saha |
| 2009/0007119 | A1 | 1/2009 | Blumrich |
| 2009/0019231 | A1 | 1/2009 | Cypher |
| 2009/0063780 | A1 | 3/2009 | Terechko |
| 2009/0070774 | A1 * | 3/2009 | Raikin et al. ............ 718/108 |
| 2009/0089520 | A1 | 4/2009 | Saha |
| 2009/0113443 | A1 | 4/2009 | Heller |
| 2009/0138670 | A1 | 5/2009 | Mutlu et al. |
| 2009/0165006 | A1 | 6/2009 | Ceze |
| 2009/0172292 | A1 | 7/2009 | Saha |
| 2009/0172303 | A1 | 7/2009 | Welc |
| 2009/0172305 | A1 | 7/2009 | Shpeisman |
| 2009/0172306 | A1 | 7/2009 | Nussbaum |
| 2009/0172654 | A1 | 7/2009 | Zhao |
| 2009/0182956 | A1 * | 7/2009 | Caprioli et al. ............ 711/145 |
| 2009/0204969 | A1 | 8/2009 | Abadi |
| 2009/0235237 | A1 | 9/2009 | Song et al. |
| 2009/0235262 | A1 | 9/2009 | Ceze et al. |
| 2009/0260011 | A1 | 10/2009 | Snover |
| 2009/0282386 | A1 | 11/2009 | Moir et al. |
| 2009/0327538 | A1 * | 12/2009 | Iwatsuki ............ 710/100 |
| 2010/0023706 | A1 | 1/2010 | Christie et al. |
| 2010/0122073 | A1 | 5/2010 | Narayanaswamy et al. |
| 2010/0131953 | A1 | 5/2010 | Dice |
| 2010/0138841 | A1 * | 6/2010 | Dice et al. ............ 718/107 |
| 2010/0162249 | A1 | 6/2010 | Shpeisman |
| 2010/0169382 | A1 | 7/2010 | Sheaffer |
| 2010/0169579 | A1 | 7/2010 | Sheaffer |
| 2010/0169580 | A1 | 7/2010 | Sheaffer |
| 2010/0169581 | A1 | 7/2010 | Sheaffer et al. |
| 2010/0218195 | A1 * | 8/2010 | Adl-Tabatabai et al. ..... 718/107 |
| 2010/0229043 | A1 | 9/2010 | Saha |
| 2010/0325630 | A1 | 12/2010 | Flood |
| 2010/0332538 | A1 | 12/2010 | Gray |
| 2010/0332716 | A1 | 12/2010 | Sheaffer |
| 2010/0332721 | A1 | 12/2010 | Yamada |
| 2010/0332753 | A1 | 12/2010 | Gray |
| 2010/0332768 | A1 | 12/2010 | Gray |
| 2010/0332771 | A1 | 12/2010 | Gray |
| 2010/0332807 | A1 | 12/2010 | Sheaffer |
| 2010/0332808 | A1 | 12/2010 | Adl-Tabatabai |
| 2011/0099335 | A1 | 4/2011 | Scott et al. |
| 2011/0145304 | A1 | 6/2011 | Gray |
| 2011/0145552 | A1 * | 6/2011 | Yamada et al. ............ 712/228 |
| 2011/0145553 | A1 | 6/2011 | Levanoni |
| 2011/0145637 | A1 * | 6/2011 | Gray et al. ............ 714/15 |
| 2011/0145802 | A1 | 6/2011 | Levanoni |
| 2012/0179877 | A1 | 7/2012 | Shriraman et al. |
| 2012/0246453 | A1 | 9/2012 | Rozas et al. |
| 2012/0284485 | A1 | 11/2012 | Yamada |

OTHER PUBLICATIONS

Bobba—"Performance Pathologies in Hardware Transactional Memory"—Published 2007—http://www.cs.wisc.edu/multifacet/papers/isca07_pathologies.pdf—pp. 1-11.
Author Unknown—"Hw-breakpoint: shared debugging registers"—Published Sep. 16, 2009—http://lwn.net/Articles/353050/—pp. 1-3.
Scherer—"Contention Management in Dynamic Software Transactional Memory"—Published Apr. 2004—http://www.cs.rice.edu/~wns1/papers/2004-CSJP-CM.pdf—pp. 1-10.
Curnow—"An Embedded Processor Architecture With Extensive Support for SoC Debug"—Retrieved Jun. 11, 2010 http://www.design-reuse.com/articles/5505/an-embedded-processor-architecture-with-extensive-support-for-soc-debug.html—pp. 1-5.
U.S. Appl. No. 12/638,929, Apr. 4, 2012, Office Action.
Notice of Allowance dated May 31, 2013 cited in U.S. Appl. No. 12/638,214.
Office Action dated Aug. 20, 2012 cited in U.S. Appl. No. 12/638,929.
Office Action dated Aug. 16, 2012 cited in U.S. Appl. No. 12/493,164.
Office Action dated Jan. 4, 2013 cited in U.S. Appl. No. 12/638,214.
Ananian; "Unbounded Transactional Memory"; 2009; pp. 1-12; http://supertech.csail.mit.edu/papers/xaction.ps.
Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.
Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.
Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.

(56) References Cited

OTHER PUBLICATIONS

Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.
Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.
Moravan; "Supporting Nested Transactional Memory in LogTM"; Oct. 21-25, 2006; pp. 1-12; http://www.cs.wisc.edu/multifacet/papers/asplos06_nested_logtm.pdf.
Carlstrom; "The ATOMOΣ Transactional Programming Language"; Jun. 11-16, 2006; pp. 1-13; http://tcc.stanford.edu/publications/tcc_pldi2006.pdf.
Moss; "Open Nested Transactions"; Semantics and Support; 2006; pp. 1-8; http://www.cs.utah.edu/wmpi/2006/final-version/wmpi-posters-1-Moss.pdf.
Minh; "An Effective Hybrid Transactional Memory System with Strong Isolation Guarantees"; Jun. 9-13, 2007; pp. 1-12; http://tcc.stanford.edu/publications/tcc_isca2007.pdf.
Chong; "Scalable HMM based Inference Engine in LVCSR"; Mar. 31, 2009; 1 page; http://www.icsi.berkeley.edu/cgi-bin/events/event.pl?ID=000531.
Zeichick; "Massive Multi-Core Processors: The Gamer's Edge"; Oct. 4, 2007; pp. 1-2; http://developer.amd.com/documentation/articles/Pages/1042007177.aspx.
Vasantharam; "CSMP"; 2009; pp. 1-3; http://sourceforge.net/projects/mupisoft/.
Bracy; "Disintermediated Active Communication"—Nov. 9, 2006—pp. 1-4—http://ieeexplore.ieee.org/stamp/stamp.jsp?arnumber=04069172.
Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.
Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.
Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.
Lilja; "Cache Coherence in Large-Scale Shared Memory Multiprocessors: Issues and Comparisons"—Sep. 1993—pp. 1-43—http://www.arctic.umn.edu/papers/coherence-survey.pdf.
Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.
Papamarcos; "A Low-Overhead Coherence Solution for Multiprocessors with Private Cache Memories"—1984—pp. 348-354—http://www.csl.cornell.edu/courses/ece572/papamarcos.isca84.pdf.
Chuang; "Unbounded Page-Based Transactional Memory"—Oct. 21-25, 2006—pp. 1-12—http://www.cse.ucsd.edu/~wchuang/ASPLOS-06-PTM.pdf.
Swift; "OS Support for Virtualizing Hardware Transactional Memory"—2008—pp. 1-10—http://www.cs.wisc.edu/multifacet/papers/transact08_tvm.pdf.
Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.
Andrew; "A Dictionary of HTML META Tags"—Feb. 11, 2007—pp. 1-11—http://vancouver-webpages.com/META/metatags.detail.html.
Spear; "Implementing and Exploiting Inevitability in Software Transactional Memory"—2008—pp. 59-66—http://ieeexplore.ieee.org/stamp/stamp.jsp?arnumber=04625833.
Author Unknown; Wikipedia; "Software Transactional Memory"—May 7, 2009—pp. 1-7—http://en.wikipedia.org/wiki/Software_transactional_memory.
Zilles et al. "Extending Hardware Transactional Memory to Support Non-busy Waiting and Non-transactional Actions," Nov. 2006, pp. 1-10.
Joao; "Flexible Reference-Counting-Based Hardware Acceleration for Garbage Collection"—Published Jun. 20-24, 2009 pp. 1-11.
Grossman; "The Transactional Memory/Garbage Collection Analogy"—Published Oct. 21-25, 2007—pp. 1-12.
Adl-Tabatabai; "Unlocking Concurrency"—Published Dec./Jan. 2006-2007 pp. 25-33.
Carlstrom; "Executing Java Programs with Transactional Memory"—Published Mar. 26, 2007 pp. 1-32.
Diestelhorst—"Hardware Acceleration for lock-free data structures and software-transactional memory"—Published Aug. 14, 2008 pp. 1-8.
Harizopoulos—"Steps towards cache-resident transaction processing"—Published 2004 pp. 1-12.
Lie—"Hardware Support for Unbounded Transactional Memory"—Published May 7, 2004 pp. 1-111.
Saha—"Architectural Support for Software Transactional Memory"—Published 2006 pp. 1-12.
Volos—"NePalTM: Design and Implementation of Nested Parallelism for Transactional Memory"—Published 2009, pp. 1-25.
Rothermel—"Concurrency Control Issues in Nested Transactions"—Published 1992, pp. 1-36.
Author Unknown—".NET Framework 4 Beta 1 enabled to use Software Transactional Memory (STM.NET Version 1.0)"—Published Jul. 24, 2009; pp. 1-84.
Nyte—"Nesting Models in Software Transactional Memory"—Published Sep. 14, 2007; pp. 1-3.
Agrawal—"Nested parallelism in transactional memory"—Published 2008; pp. 163-174.
U.S. Appl. No. 12/495,582, Oct. 4, 2011, Office Action.
U.S. Appl. No. 12/493,163, Nov. 28, 2011, Notice of Allowance.
U.S. Appl. No. 12/493,165, Dec. 12, 2011, Office Action.
U.S. Appl. No. 12/493,167, Jan. 20, 2012, Office Action.
U.S. Appl. No. 12/493,164, Feb. 3, 2012, Office Action.
Notice of Allowance dated Sep. 13, 2012 cited in U.S. Appl. No. 12/493,168.
Notice of Allowance dated Sep. 24, 2012 cited in U.S. Appl. No. 12/493,165.
Office Action dated Oct. 24, 2012 cited in U.S. Appl. No. 12/493,162.
Notice of Allowance dated Nov. 29, 2012 cited in U.S. Appl. No. 12/638,929.
Harris et al., "Abstract Nested Transactions", Aug. 2007 CiteSeerX, http://citeseer.ist.psu.edu/viewdoc/summary?doi=10.1.1.126.3885, pp. 1-10.
Office Action dated Dec. 7, 2012 cited in U.S. Appl. No. 12/638,103.
U.S. Appl. No. 13/554,558, May 1, 2013, Office Action.
U.S. Appl. No. 13/845,467, filed Mar. 18, 2013, Gray.
Notice of Allowance dated Mar. 20, 2013 cited in U.S. Appl. No. 12/493,167.
Office Action dated Mar. 29, 2012 cited in U.S. Appl. No. 12/493,168.
Office Action dated Mar. 16, 2012 cited in U.S. Appl. No. 12/493,162.
Notice of Allowance dated Feb. 21, 2012 cited in U.S. Appl. No. 12/493,161.
Notice of Allowance dated Mar. 14, 2012 cited in U.S. Appl. No. 12/495,582.
Notice of Allowance dated Apr. 9, 2012 cited in U.S. Appl. No. 12/493,161.
Notice of Allowance dated Jun. 24, 2013 cited in U.S. Appl. No. 12/638,103.
Notice of Allowance dated Apr. 14, 2014 cited in U.S. Appl. No. 12/493,164.
Office Action dated Sep. 11, 2014 cited in U.S. Appl. No. 12/493,162.
Office Action dated Oct. 29, 2014 cited in U.S. Appl. No. 13/845,467.
Notice of Allowance dated Nov. 12, 2013 cited in U.S. Appl. No. 13/554,558.
Office Action dated Jan. 27, 2015 cited in U.S. Appl. No. 12/493,162.
Office Action dated Mar. 12, 2015 cited in U.S. Appl. No. 13/845,467.

\* cited by examiner ically significant processor caches coupled to a processor. The methods include executing an application on one or more processors coupled to one or more architecturally significant processor caches, where the application utilizes the architecturally significant portions of the architecturally significant processor caches. The methods further include at least one of generating metrics related to performance of the architecturally significant processor caches; implementing one or more debug exceptions related to performance of the architecturally significant processor caches; or implementing one or more transactional breakpoints related to performance of the architecturally significant processor caches as a result of utilizing the architecturally significant portions of the architecturally significant processor caches.

INSTRUMENTATION OF HARDWARE ASSISTED TRANSACTIONAL MEMORY SYSTEM

BACKGROUND

Background and Relevant Art

Computers and computing systems have affected nearly every aspect of modern living. Computers are generally involved in work, recreation, healthcare, transportation, entertainment, household management, etc.

Often computing system implement transactional operations where for a given set of operations, either all of the operations should be performed or none of the operations are performed. The set of operations that should all be performed or not performed may sometimes be referred to as an atomic block of operations. For example, a banking system may have operations for crediting and debiting accounts. When operations are performed to exchange money from one account to another, serious problems can occur if the system is allowed to credit one account without debiting another account. However, transactional computing maintains historical information such that operations can be rolled back if all operations in an atomic set of operations cannot be performed. If all of the operations in the atomic set of operations have been performed, then any changes to data stored in memory are committed and become globally available to other actors for reading or for further operations. Transactional computing can be implemented, in some systems, using specialized hardware that supports transactional memory. In systems where hardware does not support hardware based transaction computing, transactional computing can be performed by using software techniques. Additionally, some systems may be hardware-software-hybrid systems in which hardware can respect software locks.

In hardware and hardware-software-hybrid transactional memory systems, there may be challenges doing performance data gathering and analysis, for either offline program modification and optimization, or online adaptive/dynamic tuning and contention management.

Problems include efficiently determining (in a program that uses thousands or millions of transactions of different sizes and access patterns): which if any transactions are so large as to fail due to capacity limits; which if any transactions incur so many data conflicts with other threads that they make poor progress/throughput; which if any transactions run a long time but then are rolled back and either aborted or reexecuted, wasting precious execution time and power; where possible, what memory accesses caused the capacity overflow or contention; the ratio of transaction begin/commit/rollback/abort overhead to useful instructions committed; the ratio of rolled back instructions to useful instructions committed; and when (in consultation with a contention manager) it is time to switch to a different hybrid transactional execution mode that incurs less risks of rollback.

Of course, much instrumentation can be done in software, inline with the transactional code 'under test'. The disadvantages of this approach are it incurs 1) code bloat to compile a (usually additional) instrumented version of the code; 2) memory churn as the instrumentation stores can interfere with the cache and the transactional state cached therein, particularly in 'implicit' transaction mode; 3) power overhead, as the instrumentation instructions must be dispatched and executed (vs. hardwired event sources, muxes, and counters); 4) it is not always practical to add instrumentation sufficient to diagnose which particular loads or stores cause transactional conflicts. It is often preferable to selectively count these events in dedicated event counter hardware and/or trigger breakpoint exceptions as specific events occur.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments described herein are directed to methods practiced in a computing environment. The methods include acts for monitoring performance of one or more architecturally significant processor caches coupled to a processor. The methods include executing an application on one or more processors coupled to one or more architecturally significant processor caches, where the application utilizes the architecturally significant portions of the architecturally significant processor caches. The methods further include at least one of generating metrics related to performance of the architecturally significant processor caches; implementing one or more debug exceptions related to performance of the architecturally significant processor caches; or implementing one or more transactional breakpoints related to performance of the architecturally significant processor caches as a result of utilizing the architecturally significant portions of the architecturally significant processor caches.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein may include one or more of a number of new hardware performance event counter sources, debug exceptions, and data breakpoint event triggers, specific to a given hardware thread's execution of hardware or hardware-software-hybrid based architecturally significant processor cache instructions, such as transaction instruction as illustrated below. Additionally, embodiments may include method acts for doing performance data gathering while in architecturally significant processor cache operations such as hardware or hardware-software-hybrid transaction.

As noted, modern systems may implement architecturally significant processor caches. One such example is in the implementation of hardware based transaction management. While other architecturally significant processor cache embodiments may be implemented, examples of hardware based transaction management can be used to illustrate the significance.

Figure 1A:
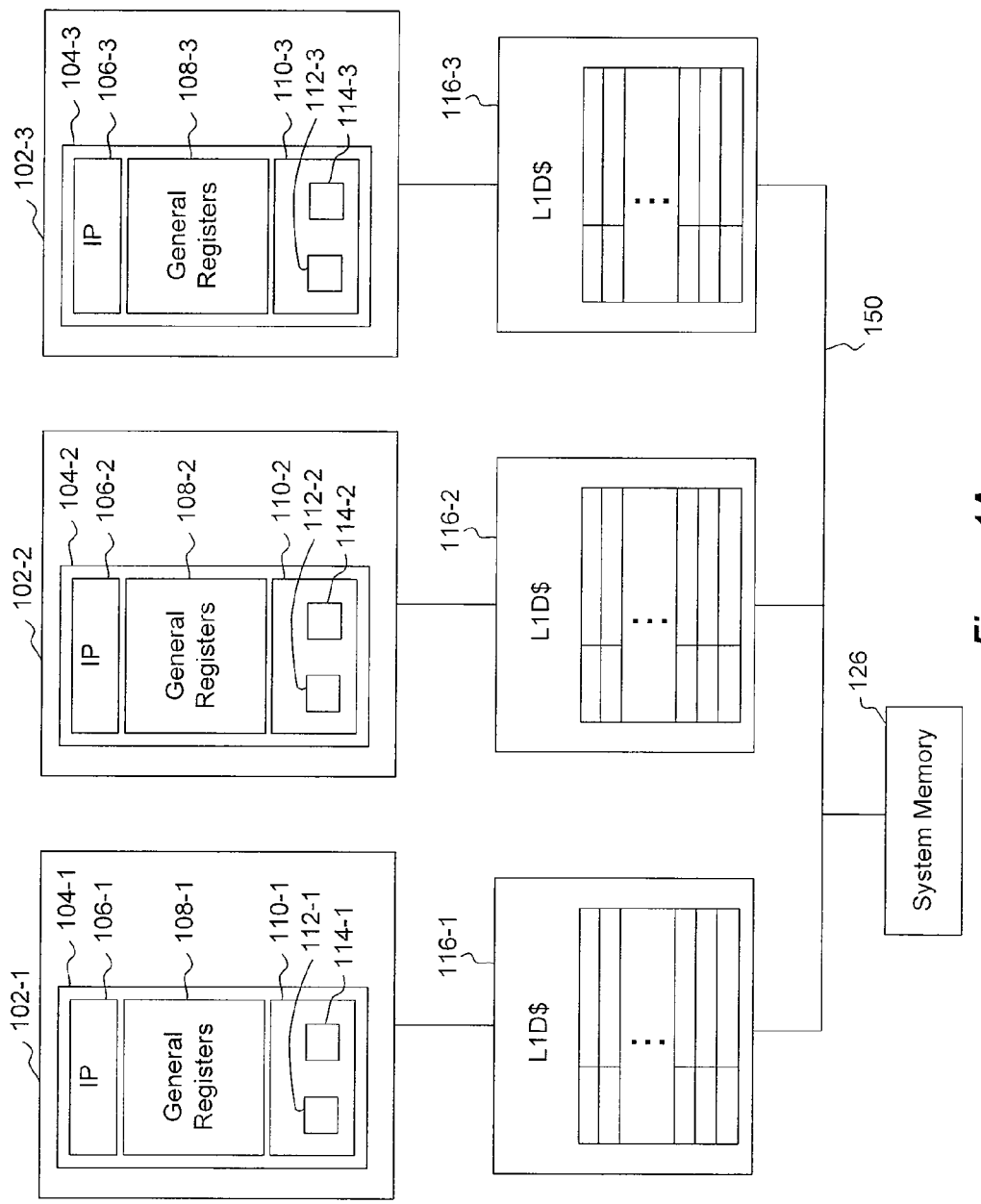
FIG. 1A illustrates a cache hierarchy.

Hardware transactional memory solutions may be implemented using cache memory. Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. However, embodiments may be implemented where processors support multiple threads. Each of the threads 104-1-104-3 includes an instruction pointer 106-1-106-3, general registers 108-1-108-3, and special registers 110-1-110-3. Each of the special registers 110-1-110-3 includes a transaction control register (TCR) 114-1-114-3 and a transaction status register (TSR) 112-1-112-3. The functionality of these registers will be explained in more detail below in conjunction with the description of FIG. 1B.

Figure 1B:
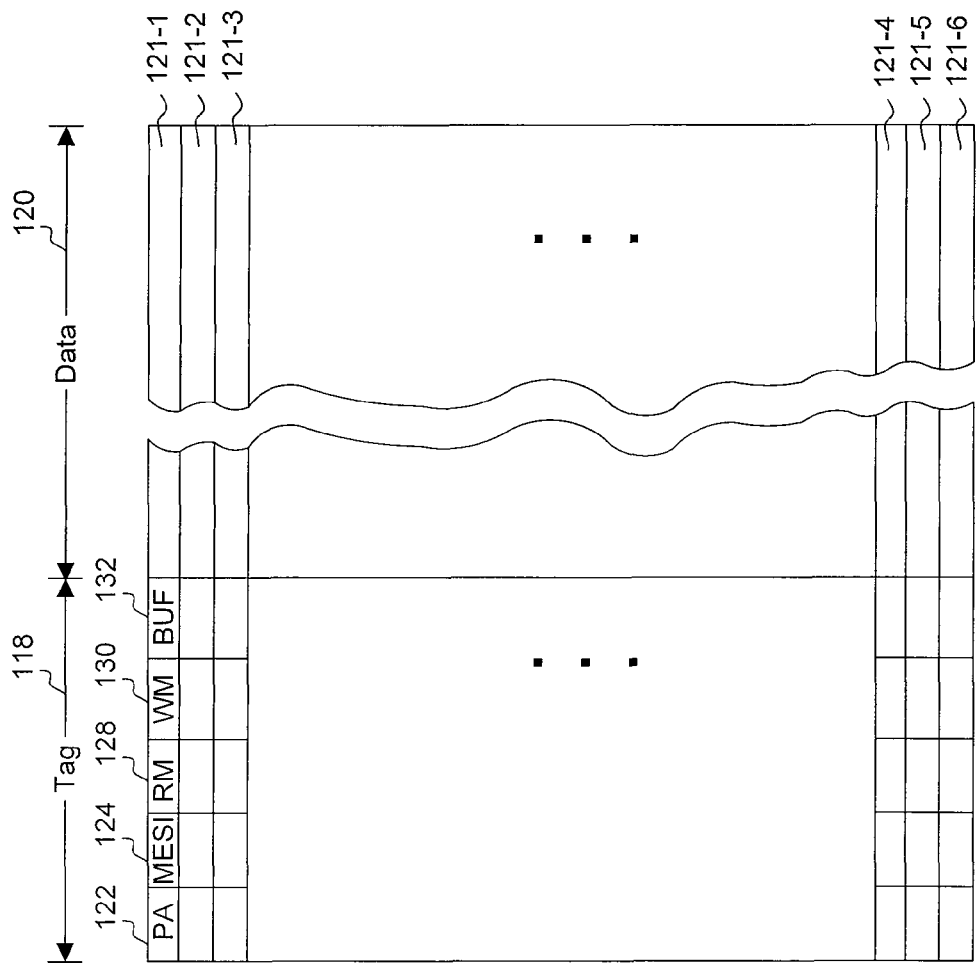
FIG. 1B illustrates details of a data cache with monitoring enabled.
Figure 2:
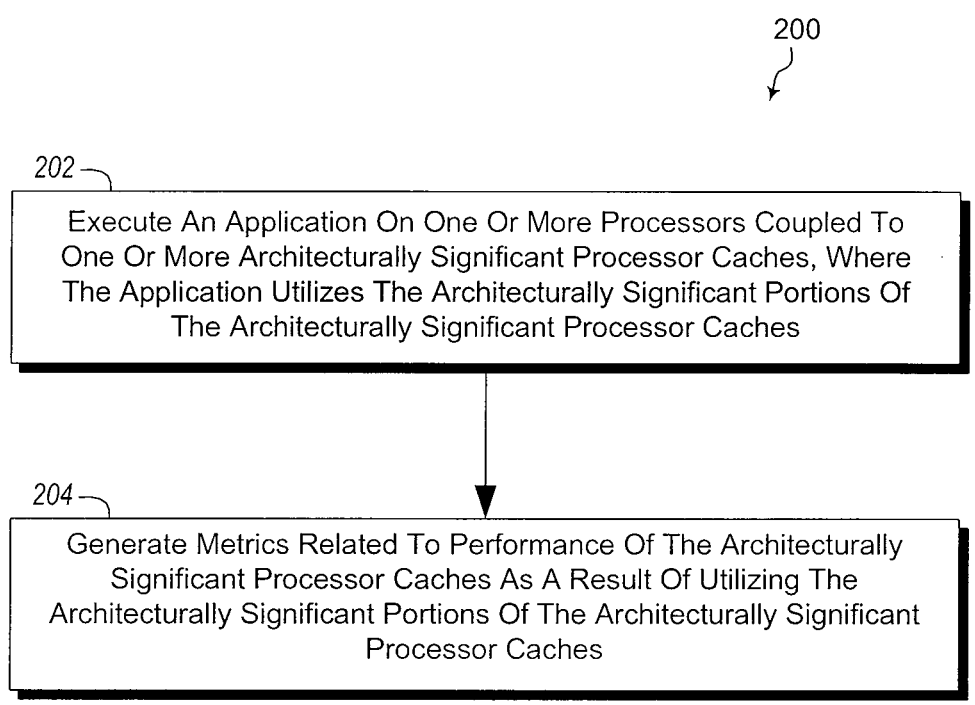
FIG. 2 illustrates a method of monitoring performance of architecturally significant processor caches.
Figure 3:
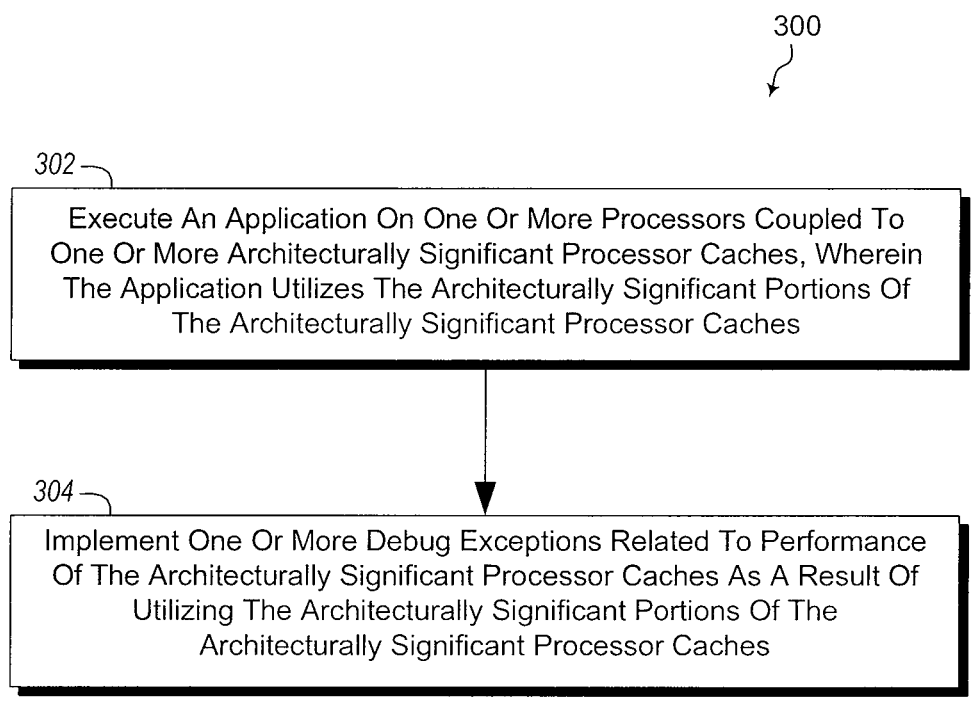
FIG. 3 illustrates another method of monitoring performance of architecturally significant processor caches.
Figure 4:
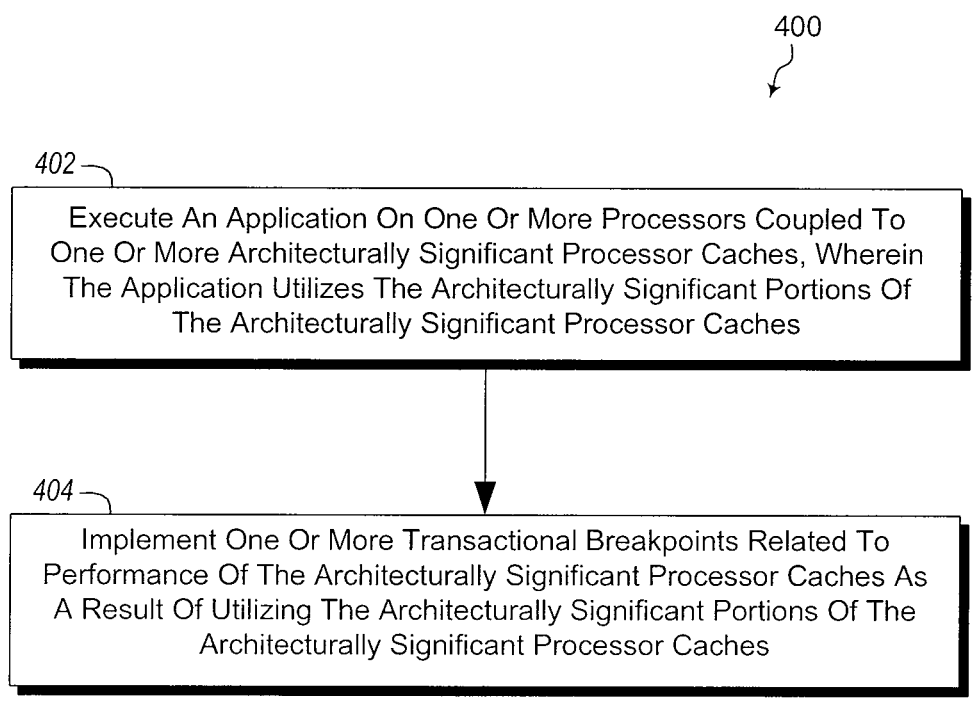
FIG. 4 illustrates another method of monitoring performance of architecturally significant processor caches.

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120, each column having one or more rows (e.g. 121-1-121-6). The tag column 118 typically includes an address column 122 and a MESI column 124. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache-coherent multiprocessor, a level of data cache that is logically private to one processor (usually level one data cache (L1D$)) may be extended with additional MESI states and behavior to provide cache coherence based detection of conflicting data accesses from other agents, and to locally buffer speculative writes in a private cache such that other agents in the system do not observe speculatively written data until the data's state transitions from speculatively written to globally observed.

The address column 122 includes a physical address for data stored in the data column 120. In particular, as illustrated in FIG. 1A, a computing system generally includes system memory 126, accessible via communication channel 150. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture.

FIG. 1B further illustrates details of the transaction status register 112 included in the hardware threads 104. The transaction status register 112 accumulates events related to the read monitor indicator, the write-monitor indicator, and the buffer monitor indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

As noted, embodiments described herein may include one or more of a number of new hardware performance event counter sources, debug exceptions, and data breakpoint event triggers, specific to a given hardware thread's execution of hardware or hardware-software-hybrid based transaction instructions. Additionally, embodiments may include method acts for doing performance data gathering while in a hardware or hardware-software-hybrid transaction.

Ejector invocation may be treated as a spontaneous branch and integrate with the processor's Last Branch recording facilities.

Debug Exceptions

The following illustrate a number of debug exceptions that may be implemented for monitoring loss in memory isolated hardware. In some of the examples illustrated, specific names of debug exceptions are called out, but it should be appreciated that other names may be used. These examples are simply to show functionality of the debug exceptions.

To allow the discovery of performance bottlenecks, the hardware provides the following mechanisms to discover loss of monitoring:

IA32_DEBUGMSR.STOP_ON_CONFLICT. This mechanism causes a debug exception (#DB) to be invoked whenever a loss of read monitor, loss of write monitor, or loss of buffering occurs. For example, with reference to FIG. 1B, this may occur when TSR.LOSS_* bits 134, 136, and/or 138 transition from 0 to 1 as a result of a monitoring conflict. In some embodiments, the #DB may be deferred until the processor executes a data memory access.

IA32_DEBUGMSR.STOP_ON_RESOURCE_LACK. This mechanism causes a #DB to be invoked whenever a loss of read monitor, loss of write monitor, or loss of buffering occurs (e.g. with reference to FIG. 1B, when TSR.LOSS_* bits transition from 0 to 1) as a result of lack of resources.

IA32_DEBUGMSR.STOP_ON_EJECTION. This mechanism causes a #DB to be invoked whenever ejection takes place within a hardware transaction.

Embodiments may be implemented where lack of resource exceptions are synchronous to program execution, making it possible to discover why transactions are overflowing the hardware resources. Embodiments may be implemented where conflict exceptions are asynchronous to program execution, so they cannot directly make it possible to find the cause of a conflict. Ejection exceptions make it possible to capture non-linear control transfer.

Embodiments may be implemented that include transactional breakpoints. In particular, to enable sophisticated low-intrusion performance tuning, the hardware may invoke the debugger on significant transactional events. For example, embodiments may include a mechanism to trigger a debug exception for any successful commit and/or a mechanism to trigger a debug exception for any unsuccessful commit.

The five configurable debug exceptions described above may allow a thread to run and later signal an unbounded transactional memory (UTM) event without having to recompile the code under test.

Performance Counters

Hardware may provide a set of performance counters to help discover subtle performance bottlenecks, including in particular hard-to-discover transactional conflicts.

The following illustrates a number of counters, one or more of which may be included in the set, to help discover general efficiency of transactional processing, making it possible to improve transactional code to reduce conflicts, improving throughput and energy efficiency.

One performance counter records the number of transactions successfully committed.

Another performance counter records the number of transactions that were aborted or otherwise failed to commit.

Another performance counter records the number of instructions retired when in a transaction (e.g. when, as illustrated at 148, TCR.IN_TX=1) and when a loss of read monitor, loss of write monitor, or loss of buffering is indicated (e.g. when, as illustrated at 134, 136, and 138, any of the TSR.LOSS_* bits are set). This indicates how many instructions are wasted. In the case of explicit mode code (i.e. code that explicitly indicates that an access should be read monitored, write monitored and/or buffered), a high number indicates that additional checks for doomed transactions may be performed to reduce wasted instructions and power consumption.

Another performance counter records the number of probable conflict events reported while in a hardware transaction (e.g. when, as illustrated at 148, TCR.IN_TX=1). A high number indicates that algorithms may need to be redesigned to reduce transactional conflicts.

Another performance counter records the number of probable resource lack events reported while in a hardware transaction (e.g. when, as illustrated at 148, TCR.IN_TX=1). A high value indicates that transaction state needs to be reduced to maximize performance.

Another performance counter records the number of instructions retired while in a hardware transaction (e.g. when, as illustrated at 148, TCR.IN_TX=1).

Another performance counter records the number of buffered stores retired.

Another performance counter enumerates the number of times ejection has taken place.

Some embodiments allow metadata about data to be stored at the same physical address as the data, but in a metadata address space different from a data address space that stores the data corresponding to the metadata. Examples of how this is performed are illustrated in U.S. patent application Ser. No. 12/493,165, filed on Jun. 26, 2009, titled Metaphysically Addressed Cache Metadata, which is incorporated herein by reference in its entirety. This can have the advantage of being able to eliminate expensive correlation tables and pointers needed to correlate data at one address to its corresponding metadata at a different address. Rather, to access metadata, an access metadata instruction (e.g. load metadata or store metadata), instead of a conventional data access instruction, is issued for the same address for the corresponding data. In particular, processor hardware may differ from conventional processor hardware by including a specialized instruction set architecture which includes specialized instructions for handling or accessing metadata. These specialized instructions may interact with specialized cache state machines and logic to make specialized accesses that make entries to store metadata in a cache where the same cache may also store the underlying data. Specific examples of such instructions are illustrated herein as MOVMD (for move metadata). Thus embodiment may be implemented with performance counters for metadata instructions. For example, a performance counter may record the number of MOVMD (write) instructions retired, while another performance counter records the number of MOVMD (read) instructions retired.

Embodiments may further include performance counters for transaction control instructions. For example, performance counters may be included for: "transaction begin" instructions retired, "transaction end" instructions retired; "transaction discard" instructions retired; "transaction discard loss" instructions retired; "transaction try to commit" instructions required when in implicit mode, and "transaction try to commit" instructions required when not in implicit mode.

Embodiments may include performance counters for explicitly unmonitored move instructions retired.

Embodiments may include performance counters for loss of read monitoring. For example, embodiments may include performance counters for loss of read monitoring with conflict events, loss of read monitoring with resource lack events, and/or unattributed loss of read monitoring.

Embodiments may include performance counters for loss of write monitoring. For example, embodiments may include performance counters for loss of write monitoring with conflict events, loss of write monitoring with resource lack events, and/or unattributed loss of write monitoring.

Embodiments may include performance counters for loss of buffering. For example, embodiments may include performance counters for loss of buffering with conflict events, loss of buffering with resource lack events, and/or unattributed loss of buffering.

Using one or more of the debug exceptions and/or one or more of the performance counters described above, various tasks can be performed.

For example, embodiments can determine which if any transactions are so large as to fail due to capacity limits. This can be performed by using software instrumentation to note or count loss of read monitoring, loss of write monitoring or loss of buffering and probable resource lack on failed transactions.

Embodiments can determine which if any transactions incur so many data conflicts with other threads that they make poor progress/throughput. In particular, embodiments may use software instrumentation to note or count loss of read monitoring or loss of write monitoring and probable conflict on failed transactions.

Embodiments can determine which if any transactions run for an extended period of time but then are rolled back and either aborted or reexecuted, wasting precious execution time and power. In particular, embodiments may use a hardware performance counter that records the number of instructions retired while in a transaction to determine size of transaction For example, in one embodiment, systems may sample the counter before and after a transaction and subtract the first sample from the second.

Similarly, embodiments can determine the amount of the transaction a system tries to execute even after the transaction is doomed due to loss of monitoring. In particular in an explicit mode cache resident transaction management system, where instruction explicitly indicate when reads and writes are monitored, embodiments use a hardware performance counter counting the number of instructions retired while in a transaction and when any one or more of indicators indicating loss of read monitor, loss of write monitor, or loss of buffering are set (e.g. TCR.IN_TX=1 and any of the TSR.LOSS_* bits are set) In particular, in one embodiment, a system may sample the counter before and after a transaction and subtract the before sample from the after sample. In the case of explicit mode code, a high number indicates that additional checks for doomed transactions may be performed to reduce wasted instructions and power consumption.

Embodiments may implement functionality to, where possible, determine what memory accesses caused the capacity overflow. In particular, in one embodiment, a system may enable #DB on ejection or failed commit. On #DB, the system examines the fault address. If the fault address includes a memory access instruction (other than a transaction commit instruction) and if a probable resource lack flag is set, the system may have located the capacity overflow instruction.

Embodiments can determine the ratio of transaction overhead, such as begin/commit/rollback/abort overhead, to useful work done. This may be accomplished by sampling, subtracting and dividing the value obtained from a generic hardware timestamp register Embodiments can determine the ratio of rolled back instructions to useful instructions committed. This may be done by referencing performance counters including a counter for the number of instructions retired while in a transaction and the number of buffered stores retired.

Embodiments can determine when (in consultation with a contention manager) it is time to switch to a different hybrid transactional execution mode. Mode switching may be made to one that incurs less rollback or to one that risks more rollback. If in implicit cache resident transactional memory modes and eject on TSR.PROBABLE_RESOURCE_LACK, then processing should switch to a mode that uses software for some conflict and version management. If in implicit CRTM modes and eject on TSR.PROBABLE_CONFLICT, a decision to rollback and reexecute depends upon contention rates and also on performance counters recording the number of instructions retired while in a transaction and recording the number of buffered stores retired. With these counters the transaction manager runtime and its contention manager can tell whether the current cache resident transactional memory transaction is short (low penalty for subsequent reexecution failure) or rather long (high penalty for subsequent reexecution failure).

For the use of any hardware performance counter above, the runtime can initialize a performance counter event selector register with the event and event mask flags to select the particular unbounded transactional memory performance event source and then sample it at the beginning and end of the code interval (e.g. one transaction or a series of transactions) and subtract to determine counts across the interval.

The following discussion now refers to a number of methods and method acts that may be performed. It may be noted, that although the method acts may be discussed in a certain order or illustrated in a flow chart as occurring in a particular order, no particular ordering is necessarily required unless specifically stated, or required because an act is dependent on another act being completed prior to the act being performed.

One embodiment is directed to a method 200 that may be practiced in a computing environment. The method includes acts for monitoring performance of one or more architecturally significant processor caches coupled to a processor. The method includes executing an application on one or more processors coupled to one or more architecturally significant processor caches, wherein the application utilizes the architecturally significant portions of the architecturally significant processor caches (act 202).

The method further includes generating metrics related to performance of the architecturally significant processor caches as a result of utilizing the architecturally significant portions of the architecturally significant processor caches (act 204). In some embodiments, as illustrated above, generating metrics related to performance of the architecturally significant processor caches comprises incrementing one or more performance counters. Examples of this are illustrated above.

One embodiment is directed to a method 300 that may be practiced in a computing environment. The method includes acts for monitoring performance of one or more architecturally significant processor caches coupled to a processor. The method includes executing an application on one or more processors coupled to one or more architecturally significant processor caches, wherein the application utilizes the architecturally significant portions of the architecturally significant processor caches (act 302).

The method further includes implementing one or more debug exceptions related to performance of the architecturally significant processor caches as a result of utilizing the architecturally significant portions of the architecturally significant processor caches (act 304). Examples of this are illustrated above.

One embodiment is directed to a method 400 that may be practiced in a computing environment. The method includes acts for monitoring performance of one or more architecturally significant processor caches coupled to a processor. The method includes executing an application on one or more processors coupled to one or more architecturally significant processor caches, wherein the application utilizes the architecturally significant portions of the architecturally significant processor caches (act 402).

The method further includes implementing one or more transactional breakpoints related to performance of the architecturally significant processor caches as a result of utilizing the architecturally significant portions of the architecturally significant processor caches (act 404). Examples of this are illustrated above.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts disclosed above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of monitoring performance of one or more processor caches coupled to a processor, the method comprising:
   executing an application on one or more processors coupled to the one or more processor caches, wherein the application utilizes one or more portions of the one or more processor caches;
   establishing a buffer monitor entry and at least one of a read monitor entry and a write monitor entry, each monitor entry being established on a cache line basis for a particular thread, the read monitor entry indicating whether a read monitor is to monitor a data block to determine when data is written to the data block by another thread, the write monitor entry indicating whether a write monitor is to monitor the data block to determine when data is read from or written to the data block by another thread, the buffer monitor entry indicating whether the data is buffered data or cached data, and whether data buffering has been lost for a specified transaction;
   determining that execution of the application has caused the read monitor, the write monitor or the buffer monitor to be reset, indicating that execution of the application has reached a potential bottleneck;
   determining the amount of the specified transaction that is executed after the transaction has been indicated as doomed as a result of a read, write or buffer monitor being reset, the amount of execution being determined by sampling a hardware performance counter before and after the specified transaction and subtracting the before sample from the after sample; and
   generating metrics related to performance of the one or more processor caches as a result of utilizing the one or more portions of the one or more processor caches, including incrementing a counter that tallies the number of times that the read monitor, the write monitor or the buffer monitor has been reset.

2. The method of claim 1, wherein the application utilizes the one or more portions of the one or more processor caches by performing at least one of buffered or monitored reads or writes.

3. The method of claim 1, wherein generating metrics related to performance of the one or more processor caches comprises incrementing one or more performance counters.

4. The method of claim 3, wherein at least one of the performance counters records a number of hardware transactions successfully committed.

5. The method of claim 3, wherein at least one of the performance counters records a number of hardware transactions that were aborted or otherwise failed to commit.

6. The method of claim 3, wherein at least one of the performance counters records the number of instructions retired when in a transaction and when a loss of read monitor, loss of write monitor, or loss of buffering is indicated.

7. The method of claim 3, wherein at least one of the performance counters records the number of conflict events reported while in a hardware transaction.

8. The method of claim 3, wherein at least one of the performance counters records the number of resource lack events reported while in a hardware transaction.

9. The method of claim 3, wherein at least one of the performance counters records the number of instructions retired while in a hardware transaction.

10. The method of claim 3, wherein at least one of the performance counters records the number of buffered stores retired.

11. The method of claim 1, further comprising using the metrics to determine which transactions are so large as to fail due to capacity limits.

12. The method of claim 1, further comprising using the metrics to determine which transactions incur so many data conflicts with other threads that they make poor progress or throughput.

13. The method of claim 1, further comprising using the metrics to determine which transactions run for an extended period of time but then are rolled back and either aborted or reexecuted.

14. The method of claim 1, further comprising using the metrics to determine the amount of a transaction a system tries to execute even after the transaction is doomed due to loss of monitoring.

15. In a computing environment, a method of monitoring performance of one or more processor caches coupled to a processor, the method comprising:
   executing an application on one or more processors coupled to the one or more processor caches, wherein the application utilizes one or more portions of the one or more processor caches;
   establishing a buffer monitor entry and at least one of a read monitor entry and a write monitor entry, each monitor entry being established on a cache line basis for a particular thread, the read monitor entry indicating whether a read monitor is to monitor a data block to determine when data is written to the data block by another thread, the write monitor entry indicating whether a write monitor is to monitor the data block to determine when data is read from or written to the data block by another thread, the buffer monitor entry indicating whether the data is buffered data or cached data, and whether data buffering has been lost for a specified transaction;
   determining that execution of the application has caused the read monitor, the write monitor or the buffer monitor to be reset, indicating that execution of the application has reached a potential bottleneck;
   determining the amount of the specified transaction that is executed after the transaction has been indicated as doomed as a result of a read, write or buffer monitor being reset, the amount of execution being determined by sampling a hardware performance counter before and after the specified transaction and subtracting the before sample from the after sample; and
   implementing one or more debug exceptions related to performance of the one or more processor caches as a result of utilizing the one or more portions of the one or more processor caches.

16. The method of claim 15, wherein at least one of the debug exceptions comprises a debug exception invoked whenever a loss of read monitor, loss of write monitor, or loss of buffering occurs.

17. The method of claim 15, wherein at least one of the debug exceptions comprises a debug exception invoked whenever a loss of read monitor, loss of write monitor, or loss of buffering occurs as a result of lack of resources.

18. The method of claim 15, wherein at least one of the debug exceptions comprises a debug exception invoked whenever ejection takes place within a hardware transaction.

19. The method of claim 1, further comprising using the debug exceptions to determine what memory accesses cause capacity overflow.

20. In a computing environment, a method of monitoring performance of one or more processor caches coupled to a processor, the method comprising:

executing an application on one or more processors coupled to the one or more processor caches, wherein the application utilizes one or more portions of the one or more processor caches;

establishing a buffer monitor entry and at least one of a read monitor entry and a write monitor entry, each monitor entry being established on a cache line basis for a particular thread, the read monitor entry indicating whether a read monitor is to monitor a data block to determine when data is written to the data block by another thread, the write monitor entry indicating whether a write monitor is to monitor the data block to determine when data is read from or written to the data block by another thread, the buffer monitor entry indicating whether the data is buffered data or cached data, and whether data buffering has been lost for a specified transaction;

determining that execution of the application has caused the read monitor, the write monitor or the buffer monitor to be reset, indicating that execution of the application has reached a potential bottleneck;

determining the amount of the specified transaction that is executed after the transaction has been indicated as doomed as a result of a read, write or buffer monitor being reset, the amount of execution being determined by sampling a hardware performance counter before and after the specified transaction and subtracting the before sample from the after sample; and implementing one or more transactional breakpoints related to performance of the one or more processor caches as a result of utilizing the one or more portions of the one or more processor caches.

* * * * *